United States Patent [19]

Nakayama et al.

[11] Patent Number: 4,531,119
[45] Date of Patent: Jul. 23, 1985

[54] METHOD AND APPARATUS FOR KEY-INPUTTING KANJI

[75] Inventors: Takeshi Nakayama, Tokyo; Masaaki Kurosu, Chofu; Yoshimitsu Ohshima; Kenji Fujikata, both of Tokyo; Shigeru Uchida, Hitachi; Akira Nakajima, Tokyo, all of Japan

[73] Assignee: Hitachi, Ltd., Tokyo, Japan

[21] Appl. No.: 676,597

[22] Filed: Nov. 30, 1984

Related U.S. Application Data

[63] Continuation of Ser. No. 384,600, Jun. 3, 1982, abandoned.

[30] Foreign Application Priority Data

Jun. 5, 1981 [JP] Japan ................................ 56-85721

[51] Int. Cl.³ ............................................. G06F 15/38
[52] U.S. Cl. .................................... 340/712; 340/711; 340/365 R; 400/110; 400/484
[58] Field of Search ................ 340/711, 712, 735, 751, 340/365 VC; 364/521, 523; 400/109, 110, 479, 489, 486, 473, 484

[56] References Cited

U.S. PATENT DOCUMENTS

| | | | |
|---|---|---|---|
| 3,929,216 | 12/1975 | Einbinder | 400/486 |
| 3,945,482 | 3/1976 | Einbinder | 400/486 |
| 4,265,557 | 5/1981 | Runge | 400/473 |

*Primary Examiner*—Gerald L. Brigance
*Attorney, Agent, or Firm*—Antonelli, Terry & Wands

[57] ABSTRACT

A method and apparatus for selectively key-inputting a Kanji (Chinese and Japanese ideogram) in a Japanese sentence are disclosed. The operator keys-in a reading of a desired Kanji through a keyboard, and candidate Kanjis for that reading are displayed on a display screen so that the operator chooses a relevant Kanji for entry out of the displayed candidate Kanjis. In entering the reading of a Kanji, blocks which are in correspondence to character keys located in home positions of the keyboard and in the neighborhood thereof are displayed on the display screen and candidate Kanjis corresponding to the reading of the desired Kanji are displayed in the blocks. The operator then keys a character key corresponding to a relevant candidate Kanji displayed on the display screen.

27 Claims, 4 Drawing Figures

METHOD AND APPARATUS FOR KEY-INPUTTING KANJI

This application is a continuation of application Ser. No. 384,600, filed June 3, 1982 now abandoned.

BACKGROUND OF THE INVENTION

1. Field of the Invention

The present invention relates to a method and apparatus for key-inputting Chinese and Japanese ideograms called "Kanji" through a Japanese sentence typewriter or the like, wherein the operator keys-in a reading of a Kanji to be entered on a keyboard having character keys for entering the reading of Kanji, candidate Kanjis having that reading are then displayed on the display screen, and the operator selects one of the displayed candidate Kanjis which meets the operator's intention.

2. Description of the Prior Art

There have been known the following methods for selecting Kanji in Japanese sentence typewriters using a so-called candidate display-and-choice method, in which a number of candidate Kanjis are displayed in response to the key operation and the operator chooses a relevant one.

In one method, a number of candidate Kanjis are displayed with identification numbers on a row in the lower section of the display screen and the operator chooses a relevant Kanji to be inputted in typewriting a Japanese sentence by depressing a numeric key corresponding to that Kanji. In this method, if a large number of candidate Kanjis are displayed, the operator has to scan visually a wide range of the screen in searching for a relevant Kanji in the displayed character string. In addition, numeric keys, which are used for designating Kanjis, are generally located at the top of the keyboard, regardless of whether it is an alphanumeric keyboard or a "Kana" (Japanese phonograms) keyboard (which uses the so-called "Kana's" including two types of "Hiragana" and "Katakana") and this is very inconvenient in operation. Therefore, this method not only causes fatigue of the operator's eyes from a long term operation, but provides a low typewriting speed due to the inconvenient key operation for choosing Kanji.

In another method, candidate Kanjis are displayed sequentially at the next character position of the sentence which is being displayed. This is carried out in such a way that a Kanji having the first priority is first displayed, and if it is not the relevant Kanji, a candidate Kanji having the second priority is displayed at the same position by depressing a display key for designating the second priority candidate. The operation is repeated until the relevant Kanji is displayed, and upon appearance of the revelvant Kanji it is entered by depressing the selection key. This method does not require the visual scanning motion for searching for the relevant Kanji but the operator has to depress the display key several times before finding the relevant Kanji with a low-order priority, and high-speed typewriting for a Japanese sentence cannot be expected.

SUMMARY OF THE INVENTION

It is therefore an object of the present invention to provide a method and apparatus for key-inputting Kanji at a high speed without fatiguing the operator.

In order to achieve the object, the present invention is characterized in that blocks or frames which are in correspondence to some character keys in the home positions of the keyboard and in the vicinity thereof are displayed on the screen, candidate Kanjis are displayed in the blocks at the same time, and the operator depresses one of the character keys corresponding to a relevant Kanji, so that it is chosen and key-inputted.

DESCRIPTION OF THE PREFERRED EMBODIMENTS

An embodiment of the present invention will now be described in detail with reference to the accompanying drawings.

Figure 1:
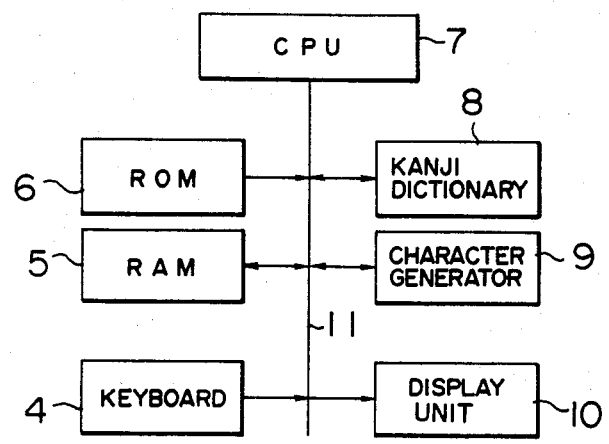
FIG. 1 is a block diagram showing a Kanji key-inputting apparatus according to an embodiment of the present invention.

FIG. 1 shows in block diagram an arrangement of the Kanji key-inputting apparatus according to an embodiment of the present invention, which comprises a keyboard 4, a random access memory (RAM) 5, a read only memory (ROM) 6, a central processing unit (CPU) 7, a Kanji dictionary 8, a character generator 9, a display unit 10, and a data bus 11.

Figure 2:
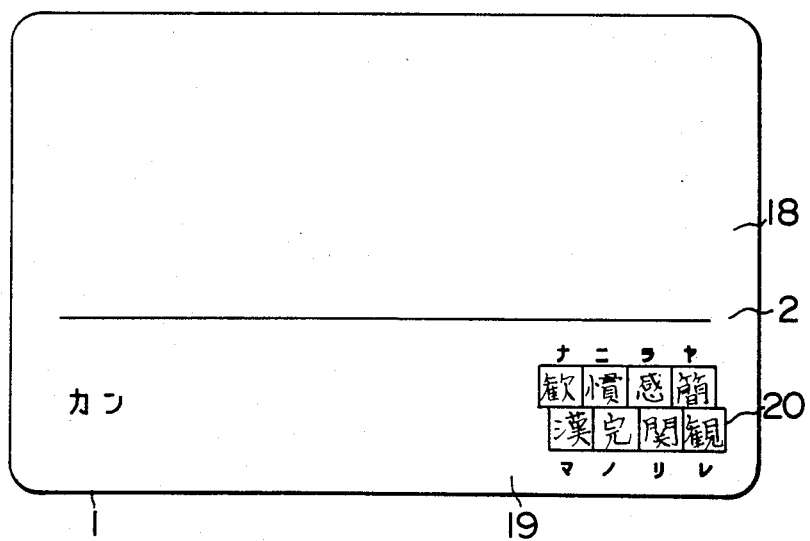
FIGS. 2 and 3 are illustrations showing a display screen and a keyboard arrangement, respectively, embodying the present invention.
Figure 3:
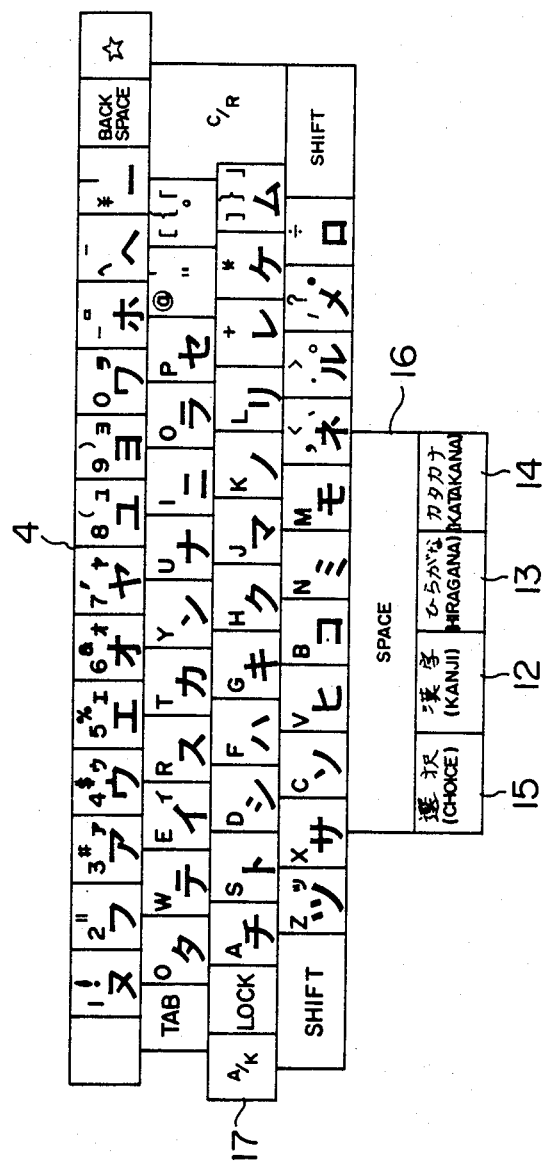
Figure 4:
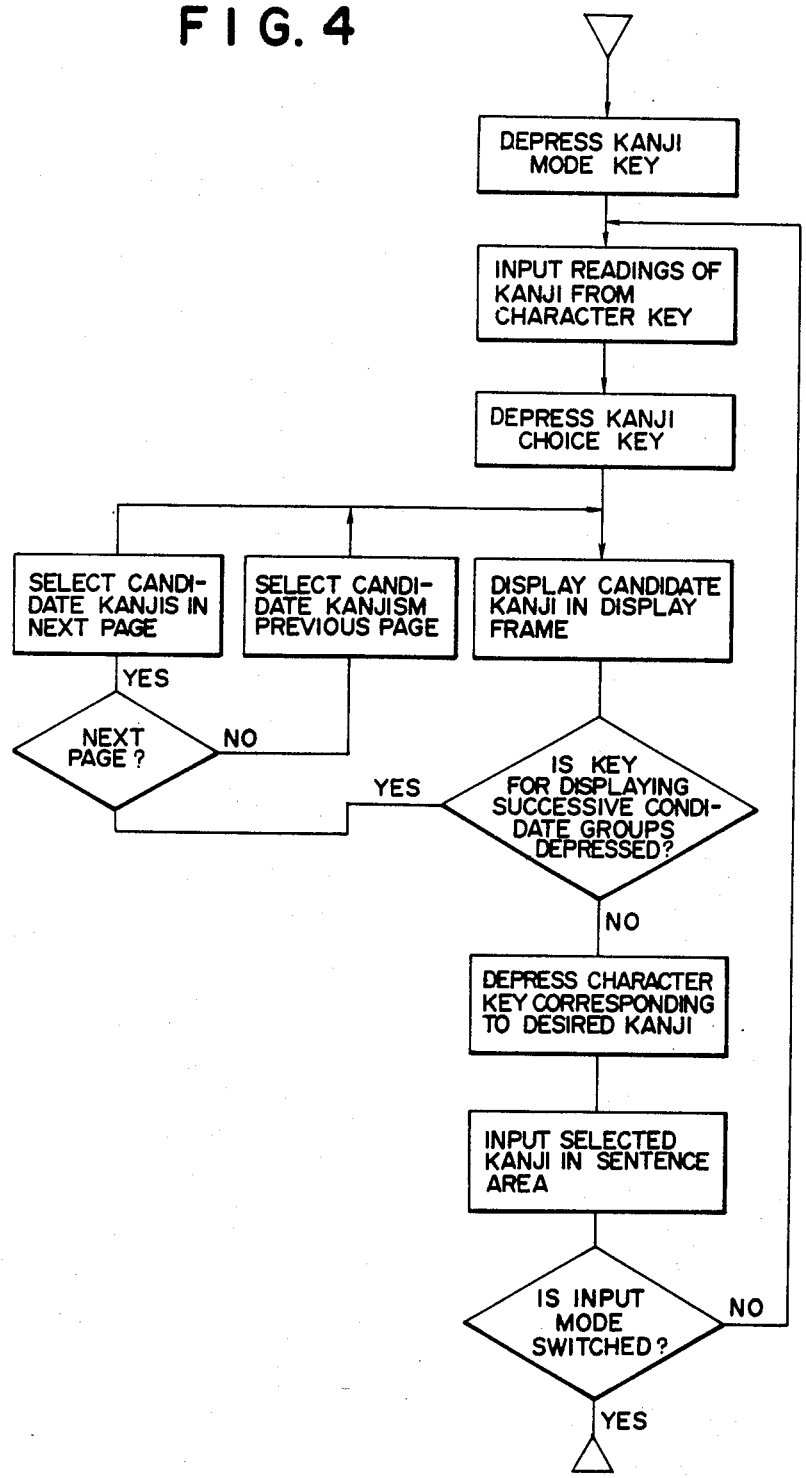
FIG. 4 is a flowchart illustrating the operation of the Kanji key-inputting apparatus according to the embodiment of the present invention.

FIG. 2 shows an example of a display which appears on the screen of the display unit 10 in FIG. 1. FIG. 3 exemplifies the key arrangement of the keyboard 4 shown in FIG. 1. FIG. 4 shows the process flow of Kanji entry carried out principally by the CPU 7 shown in FIG. 1.

The keyboard 4 has input mode selection keys including a "Kanji" mode key 12, a "Hiragana" mode key 13 and a "Katakana" mode key 14, a Kanji choice key 15, a space key 16, and an alphanumeric/Kana selection key 17, in addition to character keys for entering Kana, alphabetic and numeric characters, as shown in FIG. 3.

In such a keyboard arrangement, when a string of Hiragana is to be inputted, for example, the Hiragana mode key 13 should be depressed first, then character keys representing desired Hiragana should be depressed sequentially. The Hiragana mode is maintained until another mode key is depressed to change the mode. For entering a Katakana, the Katakana mode key 14 should be depressed first, then the character key representing the desired Katakana should be depressed.

When a Kanji is to be inputted, the Kanji mode key 12 should be depressed first, then a reading of the Kanji i.e., its phonetic spelling should be keyed-in using the alphanumeric/Kana keys. When the choice key 15 is depressed after the reading of the Kanji has been keyed-in, in accordance with a program (procedure) stored in the ROM 6 the CPU 7 searches the Kanji dictionary 8 for the codes of Kanji having that reading. Then, the CPU 7 actuates the character generator 9 to generate Kanji patterns corresponding to the retrieved Kanji codes and displays them on the screen of the display unit 10.

FIG. 2 illustrates a layout of the display screen 1, which is divided by a boundary line 2 into an input sentence display area 18 and a system area 19 for controlling inputting of characters. On the right side of the system area 19 there are displayed eight blocks 20 for exhibiting eight candidate Kanjis on two rows, and the reading of a desired Kanji, e.g. "カン(kan)" as shown in the figure, is displayed on the left side of the system area.

The candidate Kanji-exhibiting blocks or frames 20 are arranged corresponding to the arrangement of the keys "マ", "ノ", "リ", "レ", "ナ", "ニ", "ラ" and "ヤ" (or keys J, K, L, +, U, I, O, P), so that the desired Kanji is selected and entered by depressing the character key corresponding to the block after operation of the choice key 15.

The character keys corresponding to the candidate frames 20 have been determined in consideration of the operator's right hand home positions by way of example. That is, the home positions of the right hand first, second, third and fourth fingers are specified to character keys "マ", "ノ", "リ" and "レ" (or J, K, L, +), respectively, and the fingers are placed on these keys when the right hand is idle or ready. This provides the easiest and most reliable key access for operators who are skilled in any degree in the touch typewriting method. The next four easy-access character keys "ナ", "ニ", "ラ" and "ヤ" (or U, I, O. P) are located in the next stage up from the stage of the first-mentioned home position keys.

According to one embodiment of the present invention, the four keys in the right hand home position and the four keys in the upper stage above the home positions are used for the character keys corresponding to the candidate blocks 20, whereby the operator skilled in the touch typewriting method can key-in a character key promptly without looking at the keyboard in response to the relevant Kanji displayed in the candidate blocks 20. It would be more convenient for the operator if the character of each character key is displayed in the neighborhood of the corresponding candidate block 20.

On the other hand, the first, second, third and fourth fingers of the left hand have respective home positions specified to character keys "ハ", "シ", "ト" and "チ" (or F, D, S, A), and these character keys are used to turn pages for Kanji characters to be displayed. Such page turning is performed for a reading which has expressions of more than eight candidate Kanjis. According to one embodiment of the present invention, two of the character keys in the left hand home positions, i.e. keys "ハ" and "チ" (or F, A), are used as the page turning keys, Thus, upon depression of the "ハ" key following the Kanji-mode-key operation, candidate Kanjis in the second page are displayed in the blocks 20, and other candidate Kanjis in the third page are displayed by depressing the "チ" key, so that the operator can easily use key-in page-turning keys for enabling successive candidate Kanji groups to be displayed without looking at the keyboard. It will be appreciated that the "シ" (D) key and "ト" (S) key may be used for turning pages in addition to the "ハ" key and the "チ" key.

According to the present invention, as described above, candidate Kanjis for a keyed-in reading can be seen at a glance and the relevant Kanji can be chosen by the touch typewriting method without looking at the keyboard. Consequently, the arrangement of the present invention not only allows high-speed entry for Kanji, but relieves the operator from being tired from key-inputting a lot of sentences.

In the foregoing embodiment, the character keys located in the right hand home positions and in the key stage immediately above the home positions are used for designating candidate Kanjis in the blocks. Alternatively, only the right hand home position keys may be used, or the character keys located in the right hand home positions and lower stage keys below the home positions, i.e. "モ", "ネ", "ル" and "メ" (M, <, >, ?), may be used, or further other character keys located near the right hand home positions may also be used. Also, character keys located in the left hand home positions, i.e. "チ", "ト", "シ" and "ハ", may be used for designating candidate Kanji in place of the character keys in the right hand home positions or above or below the home position. In such a case, the exhibiting blocks 20 in FIG. 2 are displayed in two groups on a row each including four characters in the right section and left section of the screen.

Furthermore, the choice key 15 and page-turning keys may employ other keys than those mentioned above. For example, the space key 16 may be commonly used, thus dispensing with the choice key 15.

Moreover, character keys located in the left hand home positions and above or below the home positions may be used as the character keys for designating display of candidate Kanji. In such a case, character keys in the right hand home positions may be used as the page turning keys. It is also possible to use other keys than those mentioned above as the choice key and the page-turning keys. For example, the space key 16 may be used as the choice key.

The present invention can also be applied to Kanji key-inputting systems in which the reading of Kanji is keyed-in in an alphabetic format instead of using Hiragana or Katakana. In this case, the alphanumeric/Kana selection key 17 shown in FIG. 3 is depressed first so that alphabetic characters labeled in the upper portion of each key-top are effective. The home positions of the operator's hands are the same as in the case of the above-mentioned Kana keying system.

According to the present invention, as described above, blocks which are in correspondence to some character keys located in the keyboard home positions and in the vicinity thereof are displayed on the screen and candidate Kanjis are displayed in the blocks on the screen, thereby to allow selective inputting of Kanji at a high speed and relieve the operator from being tired considerably.

We claim:

1. A method of key-inputting a first character by operating keys for a second character comprising:
    (a) a first step of keying through a keyboard for the second characters a reading of the first character to be entered;
    (b) a second step of displaying candidate first characters having said keyed reading in blocks displayed on the screen of a display device, said blocks only being located substantially in correspondence to keys located in home positions of the keyboard and in the neighborhood of said home positions; and
    (c) a third step of operating one of said keys located in a home position or in the neighborhood of said home positions on said keyboard corresponding to said first character to be entered out of said candidate first characters displayed in said second step to choose said first character to be entered.

2. A method according to claim 1, wherein said second step comprises a step of displaying said first characters in blocks which are in correspondence to keys located in the right hand home positions of said keyboard and in an upper key row adjacent to said home positions.

3. A method according to claim 2, wherein said second step comprises a step of displaying a next group of candidate first characters in said blocks displayed on said screen by a key operation for a key located in the left hand home positions of said keyboard.

4. A method according to claim 2, wherein said second step comprises a step of displaying a next group of candidate first characters in said blocks displayed on said screen by a key operation for a key located in home positions of the other hand on said keyboard.

5. A method according to claim 1, wherein said first character is a Chinese and Japanese ideograph "Kanji" and said second characters are Japanese Kanas or alphabetic characters.

6. A method according to claim 1, wherein said second step comprises a step of displaying first characters in blocks which are in correspondence to keys located in home positions of one hand on said keyboard and in either an upper key row or a lower key row adjacent to said home positions.

7. A method according to claim 1, wherein said displayed candidate characters of said second step correspond in homophone to the reading of said first characters to be entered which is keyed in during said first step.

8. An apparatus for key-inputting a first character by operating keys for a second character comprising;
  (a) a keyboard having a plurality of keys for the second characters arrayed thereon for keying a reading of a first character to be entered;
  (b) display means responsive to the operation of said keyboard to display candidate first characters having said keyed reading in blocks which are only located in correspondence substantially to character keys located in home positions of the keyboard and in the neighborhood of the home positions;
  (c) a dictionary memory for storing first characters corresponding to each reading; and
  (d) control means for controlling said display means to display candidate first characters read out from said dictionary memory in said blocks on said display means in response to entry of the reading of a first character to be entered through said keyboard, and to select the first character to be entered in response to a key operation of one of the second character keys located in home positions and in the neighborhood of the home positions.

9. An apparatus according to claim 8, wherein said display means displays blocks which are in correspondence to keys located in the right-hand home positions on said keyboard and in an upper key row adjacent to said home positions.

10. An apparatus according to claim 9, wherein said control means comprises a means for displaying a next group of candidate first characters in said blocks on the screen in response to a key operation for a key located in the left-hand home positions of said keyboard.

11. An apparatus according to claim 9, wherein said first character is a Chinese and Japanese ideograph "Kanji" and said second characters are Japanese Kanas or alphabetic characters.

12. An apparatus according to claim 8, wherein said display means displays blocks which are in correspondence to keys located in the home positions of one hand on said keyboard and in an upper key row or a lower key row adjacent to said home positions.

13. An apparatus according to claim 12, wherein said control means comprises a means for displaying a next group of candidate first characters in said blocks on the screen in response to a key operation for a key located in home positions for the other hand on said keyboard.

14. An apparatus according to claim 8, wherein said displayed candidate first characters correpond in homophone to the reading of said first characters to be entered which is keyed in with said keyboard.

15. A method of key-inputting a Chinese or Japanese ideograph "Kanji" comprising:
  (a) a first step of keying through a keyboard a reading or phonetic version of a desired Kanji to be entered in a Japanese Kana or alphabetic format;
  (b) a second step of displaying candidate Kanjis having said keyed reading or phonetic version of said desired Kanji in blocks displayed on the screen of a display device, said blocks only being located substantially in one-to-one corresponding relation to keys located in home positions of the keyboard and in the neighborhood of said home positions; and
  (c) a third step of operating one of said keys located in a home position or in a neighborhood of said home positions on said keyboard corresponding to said desired Kanji out of said candidate Kanjis displayed in said second step to choose said desired Kanji.

16. A method of key-inputting a Kanji according to claim 15, wherein said second step comprises a step of displaying said candidate Kanjis in blocks which are located in correspondence to keys located in the right-hand home positions of said keyboard and in an upper key row adjacent to a key row of said home positions.

17. A method of key-inputting a Kanji according to claim 15 or 16, wherein said second step comprises a step of displaying a next group of candidate homophonic Kanjis in said blocks displayed on said screen by a key operation for a key located in at least the left-hand home positions of said keyboard.

18. A method of key-inputting a Kanji according to claim 15, wherein said second step comprises a step of displaying said candidate Kanjis in blocks which are located in correspondence to keys located in home positions of one hand on said keyboard and in an upper key row or lower key row adjacent to a key row of said home positions.

19. A method of key-inputting a Kanji according to claim 15 or 16, wherein said second step comprises a step of displaying a next group of candidate homophonic Kanjis in said blocks displayed on said screen by a key operation for a key located in home positions of the other hand on said keyboard.

20. A method according to claim 15, wherein said candidate Kanji displayed in said second step corresponds in homophone to the reading of said Kanji keyed in during said first step.

21. An apparatus for key-inputting a Chinese or Japanese ideograph "Kanji" comprising:
  (a) a keyboard having a plurality of character keys for either Japanese Kana characters or alphabetic characters for keying a reading of a Kanji character to be entered;
  (b) display means responsive to the operation of said keyboard to display predetermined blocks in which each contain a Kanji symbol upon operation of predetermined keys of said keyboard, wherein said displayed Kanji symbols all have said keyed reading, and wherein the display blocks of Kanji symbols substantially correspond only to character keys located in home positions of one hand on said keyboard and character keys located immediately adjacent to the home positions of said one hand on said keyboard; and (c) control means to select one of said plurality of displayed Kanji symbols by operation of one of said character keys in said home positions of said one hand or one of said character keys immediately adjacent to said home positions of said one hand on said keyboard.

22. An apparatus according to claim 21, wherein said control means further comprises means for changing display blocks of Kanji characters to alternate blocks of Kanji characters in response to the operation of keys on said keyboard located in home positions of the other hand on said keyboard.

23. An apparatus according to claim 22, wherein said one hand is the right hand.

24. An apparatus according to claim 21, wherein said one hand is the right hand.

25. An apparatus according to claim 21, wherein said home positions of said one hand correspond to four home finger positions of said one hand on said keyboard.

26. An apparatus according to claim 25, wherein said display blocks correspond to character keys located in said four home finger positions and four immediately-adjacent keys either immediately above or immediately below said four home finger positions.

27. An apparatus according to claim 21, wherein said displayed Kanji symbols are homophones of one another.

* * * * *